United States Patent Office 3,560,262
Patented Feb. 2, 1971

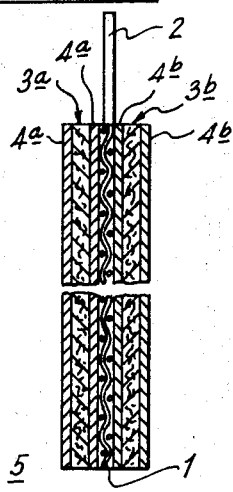
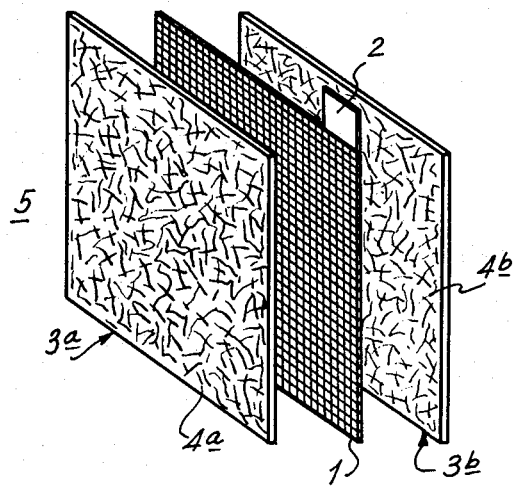

3,560,262
ELECTRODE WITH A NON-WOVEN FABRIC BASE AND ELECTROPLATED COATINGS OF NICKEL
Hideo Baba, Tokyo, and Yoshio Yamashita, Yokohama-shi, Kanagawa-ken, Japan, assignors to Sony Corporation, Tokyo, Japan, a corporation of Japan
Filed Dec. 6, 1968, Ser. No. 781,922
Claims priority, application Japan, Dec. 8, 1967, 43/103,176
Int. Cl. H01m 35/30
U.S. Cl. 136—76         4 Claims

ABSTRACT OF THE DISCLOSURE

A battery electrode is composed of a porous fabric base, such as, non-woven nylon, on which there is non-electrolytically plated a thin coating of conductive metal onto which there is electroplated a relatively thick coating of metal, such as nickel, and the thus plated base then has an active material, such as nickel hydroxide or cadmium hydroxide deposited in its pores. An electrode terminal may be connected directly to the resulting electrode structure or two such bases may be sandwiched together with a nickel mesh interposed therebetween and with the electrode terminal attached to the mesh.

---

This invention relates to electrodes for secondary or rechargeable batteries, such as, alkaline batteries, particularly of the nickel-cadmium type.

Heretofore, electrodes for nickel-cadmium batteries have been either of the so-called sintered type or of the pocket type. In the sintered type electrodes, the active material is packed into the numerous pores of a porous base plate produced by sintering pressed carbonyl nickel powder at about 900° C. for approximately 15 minutes. In the pocket type electrodes, the active material is packed into pockets of a metal base plate. In either case, the nickel hydroxide $Ni(OH)_2$ used as a positive active material for the anode and cadmium hydroxide $Cd(OH)_2$ used as a negative active material for the cathode are either chemically sedimented, electrochemically precipitated or directly packed into the pores or pockets, after which the active materials are oxidized or reduced by a first charge to convert the nickel hydroxide into nickel oxide NiO and cadmium hydroxide into cadmium Cd, thus providing the electrodes for a battery.

However, the sintered type electrode requires expensive carbonyl nickel powder and its manufacture involves a troublesome and costly high-temperature sintering process. On the other hand, the pocket type electrode has a far poorer discharge characteristic than the sintered type electrode and its electromotive force is significantly lowered after prolonged use.

Accordingly, it is an object of this invention to provide battery electrodes, particularly for alkaline batteries, such as of the nickel-cadmium type, that can be inexpensively and easily produced and that have excellent operating characteristics.

Another object is to provide battery electrodes of the described type having bases constituted by relatively light fabric materials which provide large surface areas for reception of the active materials.

A further object is to provide long-lived electrodes for nickel-cadmium batteries.

In accordance with an aspect of this invention, a battery electrode is composed of a fabric base, preferably of a non-woven or felted type, which is non-electrolytically plated with a thin conductive metal coating, for example of nickel, whereupon, a relatively thick metal coating is electroplated onto the thin conductive coating, and the thus plated base has an active material, such as nickel hydroxide or cadmium hydroxide, deposited in its pores.

The electrode produced as above may have an electrode terminal directly affixed thereto, or the electrode may be constituted by two of the plated fabric bases carrying the active material and which are sandwiched together with an interposed nickel mesh to which the electrode terminal is affixed.

The above, and other objects, features and advantages of the invention, will be apparent in the following detailed description of illustrative embodiments which is to be read in connection with the accompanying drawing, wherein:

FIG. 1 is a cross-sectional view of a battery electrode according to one embodiment of this invention; and FIG. 2 is an exploded perspective view of the element of the electrode shown on FIG. 1.

Referring to the drawing in detail, it will be seen that a battery electrode according to this invention may comprise a rectangular, or other suitably shaped sheet 1 of nickel mesh for collecting electric power and having an electrode terminal 2 projecting from an edge thereof. The nickel mesh 1 is interposed between a pair of bases 3a and 3b. The bases 3a and 3b have many pores into which active materials are packed. In accordance with the present invention, the bases 3a and 3b are formed of alkali-proof fabric materials, such as glass fiber paper or the so-called non-woven fabrics of nylon, acrylic or like fibers. The fabric bases 3a and 3b have a conductive metal, such as nickel or the like deposited thereon, as indicated by 4a and 4b and are then assembled with the nickel mesh 1 to form a unitary structure, as shown on FIG. 1.

The fabric bases 3a and 3b are provided with their conductive metal layers by first plating the same with nickel or like conductive metal by means of non-electrolytic plating. This non-electrolytic plating may take place in a known manner. For example, when the fabric base is of a non-woven nylon fabric, such base is preliminarily processed to form a palladium layer on the surface thereof and is then immersed in an ordinary non-electrolytic nickel plating bath to form a nickel coating of at most a few microns on the surface of the fabric. The resulting nickel coating is of poor mechanical strength and would readily be removed from the fabric by subsequent charge-discharge cycles, so that the active material could not be retained thereby on the fabric base. To avoid this, the thin nickel coating is subjected to electrolytic plating of nickel or like metal, by which the metal indicated by 4a and 4b is firmly deposited to a substantial thickness on the bases 3a and 3b.

In the case of electrodes for a nickel-cadmium battery, a pair of electrode elements are prepared as above. There, the electrode element which will ultimately serve as an anode, is immersed in a nickel nitrate solution and then treated with alkali thereby to precipitate and sediment nickel hydroxide in the pores of the bases 3a and 3b of such electrode element. These operations are repeated to provide sufficient active material in the pores for obtaining the desired capacity. The other electrode element, which will be ultimately used as a cathode, is subjected to similar treatment with cadmium to deposit cadmium hydroxide in the pores of its bases 3a and 3b. Thereafter, the resulting anode and cathode electrodes are placed in a cell filled with an electrolyte and with a separator therebetween and the nickel hydroxide and cadmium hydroxide are respectively reduced into nickel oxide and cadmium by a first charge. Alternatively, the anode and cathode electrodes may be assembled together with a separator therebetween which is imbued or impregnated with an electrolyte, and then the assembly may be placed in a cell, after which the respective active materials are similarly reduced.

If desired, the nickel mesh may be eliminated from the electrode, in which case the electrode is constituted by the plated fabric base having active material deposited in its pores, as described, and with the electrode terminal being directly welded or attached to the plated base.

The manufacture of battery electrodes in accordance with this invention will now be further described in the following detailed example thereof:

To begin with, a piece of nylon non-woven fabric measuring 10 cm. x 10 cm. is immersed for 5 minutes in an aqueous solution containing 50 g./l. stannous chloride $SnCl_2$ and 50 cc./l. hydrochloric acid, and upon its withdrawal from that solution is fully rinsed with water. The nylon non-woven fabric is then immersed for 5 minutes in an aqueous solution containing 0.3 g./l. palladium chloride PdCl and 0.25 cc./l. hydrochloridic acid HCl, and is thereafter sufficiently rinsed with water, leaving a deposit of palladium on the surface of the fabric. Next, the palladium coated fabric is immersed for 10 minutes in a non-electrolytic plating solution containing 20 g./l. nickel sulfate, 20 g./l. hypophosphorous acid and 5 g./l. succinic sodium, whereby a nickel coating of about 1 micron thickness is deposited on the surface of the fabric.

Then, the non-woven fabric rendered conductive by the thin non-electrolytically plated coating is electroplated in an electroplating solution of the following composition with a current of 15 amperes for 25 minutes to provide an additional nickel coating of 20 to 30 microns in thickness on the surface of the fabric.

ELECTROPLATING SOLUTION

| | G./l. |
|---|---|
| Nickel sulfamate | 300 |
| Boric acid | 15 |
| Ammonium chloride | A little |
| Lauric sodium sulfate | 0.3 |

An electrode terminal is attached directly to the resulting base by spot-welding, thus providing an electrode base.

In order to deposit positive active material on the electrode base, the base is subjected to electrolytic reduction for 30 minutes in an aqueous solution containing 400 g./l. nickel chloride and 200 g./l. nickel nitrate, with a nickel rod being used as an anode and with a current which is gradually decreased from 3 amperes to 1 ampere, thereby depositing a predetermined amount of active material $Ni(OH)_2$ on the surface and in the pores of the electrode base.

In order to deposit negative active material on the electrode base, the base is immersed in an aqueous solution of 500 g./l. cadmium sulfate, after which it was immersed again in a 30% potassium hydroxide solution and electrolytic reduction similar to that described above for the anode is effected. These operations were repeated four times, with each electrolytic reduction cycle being for a period of 10 minutes, to deposit a predetermined amount of the active material, that is cadmium on the base.

An anode or nickel electrode and a cathode or cadmium electrode produced as above according to this invention, were employed in a battery with a nylon non-woven fabric separator and a 30% potassium hydroxide solution as the electrolyte, and with the battery having a capacity of 3.5 a.h. Such electrodes according to the invention were compared with electrodes produced according to a prior art method in terms of weight. The conventional anode and cathode electrodes respectively weighed 47 g. and 59 g., while the anode and cathode electrodes according to this invention respectively weighed 30 g. and 38 g. and were equal to the prior art electrodes in terms of service life.

In the above example, the active material was adequately supported on the fabric base, but the active material could be further prevented from coming off during charge-discharge cycles by spraying or coating the same with a 5 wt. percent solution of butyral resin in alcohol to such a thickness as not to inhibit the passage of ions. Such butyral resin coating increases the strength of the deposited active material.

As has been described in the foregoing, the present invention avoids the use of relatively expensive carbonyl nickel powder as a material for the bases $3a$ and $3b$ of the electrodes, and further avoids the use of the troublesome and expensive high-temperature sintering process. Since the plating processes can be affixed continuously, the electrodes of this invention can be produced at lower cost and with greater ease, than electrodes produced by conventional processes. In addition, the bases $3a$ and $3b$ are formed of fabric materials and hence are pliable and exhibit a high degree of mechanical strength, and further the use of the fabric materials for the bases of the electrodes appreciably reduces the weight of the battery.

While the present invention has been described in detail as applied to the electrodes for a nickel-cadmium battery, it is to be understood that the invention is also suitable for use in the electrodes of other batteries, for example, a nickel-zinc or silver-zinc battery.

Although specific embodiments of the invention have been described in detail herein, it is to be understood that the invention is not limited to those precise embodiments, and that various changes and modifications may be effected therein by one skilled in the art without departing from the scope or spirit of the invention.

What is claimed is:

1. An electrode for an alkaline battery comprising a plurality of porous, non-conductive bases of a non-woven fabric material, each of said bases having thereon an inner non-electrolytically plated coating of nickel and an electroplated outer coating of nickel on said inner coating and together with the latter constituting a conductive metal layer on the respective base, each of said bases further having an oxide active material on said conductive metal layer thereof, and said bases being joined together with a nickel mesh sandwiched therebetween and having an electrode terminal attached to said mesh.

2. An electrode according to claim 1, in which said active material on said conductive metal layer of each base is nickel hydroxide so as to constitute a cathode active material.

3. An electrode according to claim 1, in which said active material on said conductive metal layer of each base is cadmium hydroxide so as to constitute an anode active material.

4. A method of making an electrode for an alkaline battery comprising the steps of non-electrolytically plating a coating of nickel on each of a plurality of non-conductive bases of a non-woven fabric material, electroplating a layer of nickel on said nickel coating on each of said bases, forming an oxide active material on said nickel layer of each of said bases, and joining together said bases with a nickel mesh sandwiched therebetween.

References Cited

UNITED STATES PATENTS

| 2,610,220 | 9/1952 | Brennan | 136—19.1 |
| 3,132,053 | 5/1964 | Krebs | 136—75 |
| 3,235,473 | 2/1966 | Le Duc | 204—38.2 |
| 3,267,007 | 8/1966 | Sloan | 204—38.2 |
| 3,331,758 | 7/1967 | Levine | 204—38.2 |
| 3,403,057 | 9/1968 | Stankavich et al. | 136—120FC |

ALLEN B. CURTIS, Primary Examiner

C. F. LeFEVOUR, Assistant Examiner

U.S. Cl. X.R.

136—28, 120